United States Patent
Staehle

(10) Patent No.: US 12,455,588 B2
(45) Date of Patent: Oct. 28, 2025

(54) COUPLING DEVICE FOR FASTENING AN ACTUATOR TO AN ACTUATING MEMBER

(71) Applicant: Staehle GmbH, Wimsheim (DE)

(72) Inventor: Dieter Staehle, Tiefenbronn (DE)

(73) Assignee: Staehle GmbH, Wimsheim (DE)

( * ) Notice: Subject to any disclaimer, the term of this patent is extended or adjusted under 35 U.S.C. 154(b) by 380 days.

(21) Appl. No.: 18/161,073

(22) Filed: Jan. 29, 2023

(65) Prior Publication Data
US 2023/0176605 A1 Jun. 8, 2023

Related U.S. Application Data

(63) Continuation of application No. PCT/EP2021/025269, filed on Jul. 21, 2021.

(51) Int. Cl.
*G05G 1/483* (2008.04)

(52) U.S. Cl.
CPC .................................. *G05G 1/483* (2013.01)

(58) Field of Classification Search
CPC ............................. G05G 1/483; G05G 1/487
See application file for complete search history.

(56) References Cited

U.S. PATENT DOCUMENTS

| | | | | |
|---|---|---|---|---|
| 1,128,975 A | * | 2/1915 | Harrington | G05G 1/487 74/562 |
| 1,346,361 A | * | 7/1920 | Williams | G05G 1/487 D12/174 |
| 1,480,211 A | * | 1/1924 | Kauffman | G05G 1/487 74/562 |
| 3,662,593 A | * | 5/1972 | Pirrello | G01L 5/225 74/482 |
| 3,713,332 A | | 1/1973 | Herrbrich | |
| 5,497,678 A | * | 3/1996 | Chou | G05G 1/487 74/562.5 |
| 6,634,466 B1 | | 10/2003 | Brock et al. | |
| 7,730,806 B1 | * | 6/2010 | Grimaldi | G05G 1/483 74/562 |
| 8,615,334 B2 | | 12/2013 | Ewert | |
| 2020/0156615 A1 | | 5/2020 | Whitt | |

FOREIGN PATENT DOCUMENTS

| | | |
|---|---|---|
| DE | 2 004 979 A1 | 8/1971 |
| KR | 10-1283357 B1 | 7/2013 |
| WO | 89/00543 A1 | 1/1989 |

* cited by examiner

*Primary Examiner* — Daniel D Yabut
(74) *Attorney, Agent, or Firm* — Orbit IP, LLP; Marc G. Martino

(57) ABSTRACT

A coupling device for fastening an actuator to an actuating member has a basic body, on which a hook-shaped first coupling element and a hook-shaped second coupling element are arranged. The first coupling element has a first leg projecting from a rear side of the basic body, and a second leg extending transversely with respect to the first leg. In the mounted state of the coupling device, the first leg is arranged laterally with respect to the actuating member and the second leg is arranged behind the actuating member. The at least one second coupling element has a first leg projecting from one side of the basic body, and a second leg extending transversely with respect to the first leg. In the mounted state the first hook-shaped coupling element and the second hook-shaped coupling element engage around the actuating member in a form-fitting manner.

14 Claims, 4 Drawing Sheets

COUPLING DEVICE FOR FASTENING AN ACTUATOR TO AN ACTUATING MEMBER

CROSS-REFERENCE TO RELATED APPLICATIONS

This continuation application claims priority to PCT/EP2021/025269 filed on Jul. 21, 2021 which has published as WO 2022/022852 A1 and also German application numbers 10 2020 004 636.3 filed on Jul. 30, 2020 and 20 2020 003 278.6 filed on Jul. 30, 2020, the entire contents of which are fully incorporated herein with these references.

DESCRIPTION

Field of the Invention

The invention relates to a coupling device for fastening an actuator to an actuating member, in particular a pedal of a vehicle, wherein the coupling device can be connected to the actuator and can be brought into engagement with the actuating member, the coupling device comprises a base body on which a hook-shaped first coupling element is arranged, the first coupling element comprising a first leg projecting from a rear side of the base body and a second leg extending transversely thereto.

Background of the Invention

Such a coupling device is known from U.S. Pat. No. 6,634,466 B1. It is used to fasten an actuator on an actuating member, whereby the coupling device can be connected with the actuator and can be brought in engagement with the actuating member. In order to achieve this, it is provided that the coupling device comprises a two-part base body. In a moveable part of the base body, two projections and on a stationary part thereof, a further projection are provided. The latter is either bent upwardly, i.e., has a J-shaped form, or runs orthogonal to the lower end of the stationary part of the base body, so that a L-shaped form is present. The further projection encompasses a brake pedal described in the afore-mentioned document on its lower end and on its back side. The two projections of the movable part encompass the brake pedal on its upper side and on its rear side. The coupling device known from the afore-mentioned document therefore operates in such a way that the upper end and the adjacent rear area of the upper end and the lower end and the adjacent rear area of the lower end are encompassed.

DE 2 004 979 A discloses a coupling device and is used in particular in the automotive field in functional and durability tests of devices of a vehicle. A driving robot is frequently used in this context, the actuator of which acts on the aforementioned actuating member and thus generates an actuating sequence which largely corresponds to the actual sequences during operation of the motor vehicle by the driver thereof. Such functional and/or durability tests should preferably be carried out on vehicles which have an actuating member, generally a foot pedal such as typically an accelerator pedal, a brake pedal, a clutch pedal, or a hand pedal, or another member which can be actuated by driver's foot or hand, which, with regard to its structure and configuration, corresponds to that which is used in the production vehicle in order to enable tests which are close to reality. However, such pedals, as a rule, do not have any fastening means for an actuator of the driving robot. It is therefore necessary to use a coupling device, by means of which the actuator of the driving robot is fastened to the actuating member, so that an engagement of the actuator of the driving robot is provided on the latter and the actuator movement of the actuator of the driving robot is thus converted into an actuating movement of the actuating member.

In the known coupling devices, it is provided that a base body has a U-shaped cross section which is open to one side. A front surface of the base body serves to fasten the actuator. The rear face arranged opposite to this front face has a longitudinal slot, the width of which is matched to the width of a pivot arm of the pedal to be actuated. For mounting the known coupling device on the pedal, the latter is slid onto the lower end of the pedal, wherein the pivot arm is inserted into the longitudinal slid of the base body and an actuating plate is moved into the interior of the base body. The base body is then connected in a force-locking manner to the pedal, e.g., by screwing the base plate to an actuator plate thereof. In addition, the mounting of the coupling device on the actuating member is complex, since for this purpose the pivot arm of the pedal—as described above—must be inserted into the base body of the known coupling device.

Further embodiments of such coupling devices are known too. All of these have in a disadvantageous manner in common that the fastening of the coupling device on the actuating member, here the pedal, must be done in a force-locking manner.

U.S. Pat. No. 8,615,334 B2 discloses a coupling device for fastening an actuator on a brake pedal of a motor vehicle, wherein the coupling device can be connected to the actuator and can be brought into engagement with the actuating member. It has a base body with a base plate, wherein hook-shaped clamping elements are arranged on the upper and the lower end of the base plate respectively. First legs of the two hook-shaped clamping elements engage over the upper and lower side of the brake pedal respectively and second legs extending transversely to the first legs engage on the rear side of the brake pedal. The clamping of the clamping element on the brake pedal is done by tightening corresponding fastening screws which mount the coupling device force-lockingly onto the brake pedal. This document furthermore describes a coupling device for an accelerator pedal, which again has a base plate and two hook-shaped clamping elements projecting therefrom, wherein each of the hook-shaped clamping elements is arranged on a narrow side of the transversely arranged base plate. The fastening of the coupling device on the accelerate pedal once more is done by tightening fastening screws which fix the two clamping elements to the base plate. In both variants, the coupling device is therefore fastened to the respective pedal by a clamping, i.e., in a force-locking manner.

U.S. Pat. No. 3,662,593 A shows a force-locking fastening of a coupling device to a pedal.

A further disadvantage of the known coupling device is as follows: Actuating members, in particular accelerator, brake or clutch pedals, are often designed not only in a manufacturer-specific manner, but generally in a model-specific manner. This means that, e.g., the geometry of the pivot arm and/or of the actuating element differ significantly between vehicle models and/or between manufacturers. It follows from that either a specific coupling device has got to be used for each individual vehicle model, or that a certain coupling device can be used satisfactorily and reliably with one specific pedal, but not with any other pedal.

SUMMARY OF THE INVENTION

It is therefore the object of the present invention to further develop a coupling device of the kind described above, so that a more simple fastening of the coupling device according to the invention on an actuating member, in particular on a pedal of a vehicle, can be achieved. According to a preferred embodiment of the coupling device according to the invention it should be designed such that it can be adapted more easily to a specific geometry of an actuating member.

This object is achieved according to the invention in that the coupling device has a base body on which a hook-shaped first coupling element and at least one hook-shaped second coupling element are arranged, in that the first coupling element has a first leg projecting from a rear side of the base body and a second leg extending transversely thereto, wherein the first leg, in the mounted state of the coupling device, is arranged laterally with respect to the actuating member and the second leg is arranged behind the actuating element, and in that the at least one second coupling element has a first leg projecting from a side of the base body and a second leg extending transversely thereto, wherein, in the mounted state, the first leg extends on the front side of the actuating member and the second leg extends transversely with respect to the first leg, so that the first hook-shaped coupling element and the second hook-shaped coupling element engage around the actuating element in a form-fitting manner.

The measures according to the invention advantageously create a coupling device for fastening an actuator to an actuating member, in particular a pedal of a vehicle, which is distinguished in that the fastening of the coupling device is effected in a form-fitting manner. Such a measure has the advantage of an increased operating safety and a simpler assembly.

An advantageous embodiment of the invention provides that the first leg of the hook-shaped first coupling element and/or the first leg of the hook-shaped second coupling element can be varied in length. Such a measure has the advantage that not only an easier assembly of the coupling device according to the invention on the actuating element is made possible, but also that, due to the length adjustability of the first leg of the first and/or of the second coupling element, the distance of the second leg from the rear side of the base body of the coupling device according to the invention can be changed, so that the coupling device can be adapted in a simple manner to actuating elements configured differently.

Further advantageous further embodiments of the invention are the subject matter of the dependent claims.

BRIEF DESCRIPTION OF THE DRAWINGS

Further details and advantages of the invention are shown in the exemplary embodiment which is described below with reference to the figures. These show.

DETAILED DESCRIPTION OF THE PREFERRED EMBODIMENTS

Figure 1:
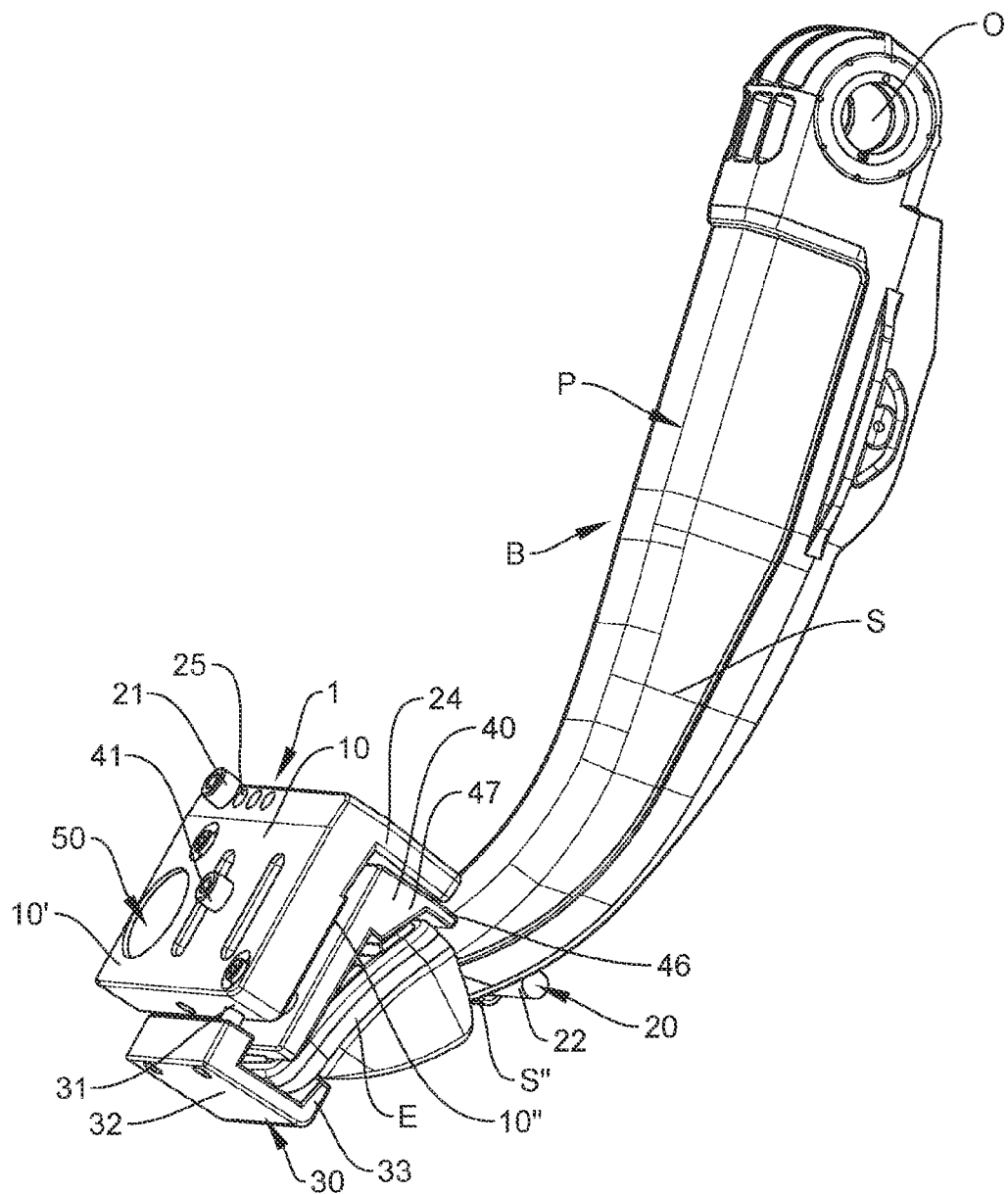
FIG. 1 is an isometric view of an embodiment of a coupling device together with an embodiment of an actuator.

FIGS. 1 to 4 now show an exemplary embodiment, generally designated by 1, of a coupling device 1 together with an actuating member B. In the exemplary embodiment shown here, the actuating member B is designed as a pedal P which has a pivot arm S having an opening O at its upper end, through which an axis, not shown in the figures, can be led, via which the pedal P can be pivotably mounted in a vehicle. At its lower end S" the pivot arm S has an actuating element E, which, in the case shown here, is designed as a pedal plate. Such an actuating member B, in particular for a vehicle, is known and therefore has not to be described in more detail. It will be apparent to those skilled in the art from the description below that the embodiment of the actuating member B shown here is only of an exemplary nature. The described coupling device 1 is not limited to use with an actuating member B designed in the way described.

The coupling device 1 has a base body 10, which is preferably plate shaped. As it can best be seen from FIGS. 3 and 4, a first coupling element 20 is arranged in the upper region of the base body 10 and a second coupling element 30 is arranged in the lower region thereof, the precise design and function of which will be described in detail below. Below the base body 10 of the coupling device 1 a pressing element 40 is arranged which is connected to the base body 10 via a clamping member 41, for example a clamping screw, so that by a movement of the clamping member 41—as described below the distance between the pressing element 40 and the base body 10 can be changed.

The first coupling element 20 is hook-shaped and has a first leg 21 extending in a first direction and projecting from a rear side 10" of the base body 10 and a second leg 22 extending in a second direction running transversely thereto, so that the hook-shaped first coupling element is formed by these two legs 21 and 22. It is preferred that the first leg 21 extends in an orthogonal direction to the rear side 10" of the base body 10 and the second leg 22 extends orthogonally to the first direction, so that the second direction is therefore collinear with the rear side 10" of the base body 10. However, it will be apparent to those skilled in the art that the above-described orthogonal arrangement of the two legs is not mandatory. Rather, it is also possible that the first direction defining the course of the first leg 21 extends obliquely to the rear side 10" of the base body 10, and/or that the second direction defining the course of the second leg 22 is not collinear with the aforementioned rear side 10" but extends inclined relative thereto. It is only essential that, when the coupling device 1 is mounted on the actuating member B, in this case on the pivot arm S of the pedal P, the first leg 21 runs laterally to and the second leg 22 runs behind the base body 10 of the actuating member B, here behind the rear side S' of the pivot arm S. The above-described embodiment therefore at least partially encloses the pivot arm S laterally and on rear side by the first coupling element 20, as can be seen from the figures.

It is preferred that the first coupling element 20 is designed to be variable in length, so that the distance of the second leg 22 supported by the first leg 21 from the rear side 10" of the base body 10 can be varied.

Preferably, it is provided that the base body 10 has a rail 24 on its rear side 10", which preferably extends over the entire width of the base body 10 and in which the first leg 21 is slidably arranged. The use of the rail 24 has the effect that the unsupported region of the first leg 21, which projects from the rear side 10" of the base body 10, can be reduced, so that an occurrence of undesirable lever moments can be at least counteracted.

Furthermore, it is preferred that the first leg 21 of the first coupling element 20 can be mounted in at least two and preferably a plurality of positions in the base body 10. In the described embodiment this is achieved in that the rail 24, which bears the first leg 21, has a plurality of receiving openings 25 for the first leg 21 which are spaced apart from one another. This measure has the advantage that it allows an easy adaptation of the coupling device 1 to actuating elements B of different widths in a simple manner.

The mode of operation of the first coupling element 20 and the advantage of the—not mandatory—extensibility thereof, will be explained further below when describing the mounting of the coupling device 1 on the actuating member B.

The second coupling element 30 arranged in the lower region of the base body 10 now serves to encompass a lower end B' of the actuating member B, in this case therefore the lower end S" of the pivot arm S. For this purpose, it is provided that the second coupling element 30 is of a hook-like design too and, as can be seen from the figures, extends around the lower end B' of the actuating member B in its mounted state. For this purpose, the second coupling element 30 too has a first leg 31 extending in a first direction, a second leg 32 extending in a second direction and preferably a third leg extending in a third direction. It is again preferred that the third leg 33 runs orthogonally to the second leg 32, which in turn is arranged orthogonally to the first leg 31, although such an orthogonal arrangement is not absolutely necessary here as well. It is essential that—analogously to the first coupling element 20—the first leg 31 extends on the front side 10' of the base body 10 and the second leg 32 is arranged below the lower end B' of the actuating member B, that is in this way the lower end B' is encompassed. The hook-shaped second coupling element 30 thus forms a lower stop, which has the effect that, when the actuator acts on the coupling device 1 and thus on the actuating member B, it cannot deflect the latter upwardly (in the illustration of the figures). The third leg 33, projecting from the second leg 32, engages behind the lower end B' of the actuating member B and acts against the rear side thereof in its mounted state. However, it is possible that this third leg 33 is not required if, by means of the first two legs 31 and 32, a sufficiently secure fastening of the second coupling element 30 to the actuating member B, for example by providing the second leg 32 with an anti-slip surface, can be ensured, so that in the mounted state the second coupling element 30 is fastened to the actuating member B in a sufficiently reliable manner.

Furthermore, it is again preferred that the second coupling element 30, as well as the first coupling element 20, can be arranged on the base body 10 in a positionally variable manner. In particular, it is preferred that the second coupling element 30 can be arranged in different width positions of the base body 10 on the narrow side thereof.

Preferably, the second coupling element 30 is designed to be variable in length too. In this case, it is preferred that the first leg 31 is arranged displaceably in the base body 10. It must be emphasized again that the length variability of the second coupling element 30 is advantageous, it is not absolutely necessary for the reasons listed below.

As described above, the second coupling element 30 engages around the lower end B' of the actuating member B and a lower stop for the coupling device 1 is formed, which has the effect that, when the coupling device 1 is subjected to a force, said lower stop cannot deflect upwards. It is preferred that the coupling device 1 has an upper stop complementary to the lower stop, which at least makes it difficult for the coupling device 1 fixed on the actuating member B to move downwards. For this purpose, in the described exemplary embodiment, it is provided that the coupling device 1 has a third coupling element 45 which forms the above-mentioned upper stop. In the exemplary embodiment described here, it is provided for this purpose that a projection 46 projecting from the rear side 40' of the pressing element 40 is arranged on the pressing element 40, as can best be seen from FIGS. 3 and 4, said projection overlapping the upper end of the actuating element E, so that a deflection of the coupling device 1—in the illustration of FIGS. 3 and 4—downward is made more difficult or is even prevented. Here too, it again can be provided that the projection 46 is mounted displaceably in the base body 40a of the pressing element 40, for example in a way this has been described for the first coupling member 20.

It is further preferred that the pressing element 40 has a rail 47 corresponding to the rail 24 of the first coupling element 20, in which the projection 46 is arranged displaceable, if desired. Here too, the unsupported length of the projection 46, which projects from the rear side 40' of the pressing element 40, is reduced by this measure.

Figure 3:
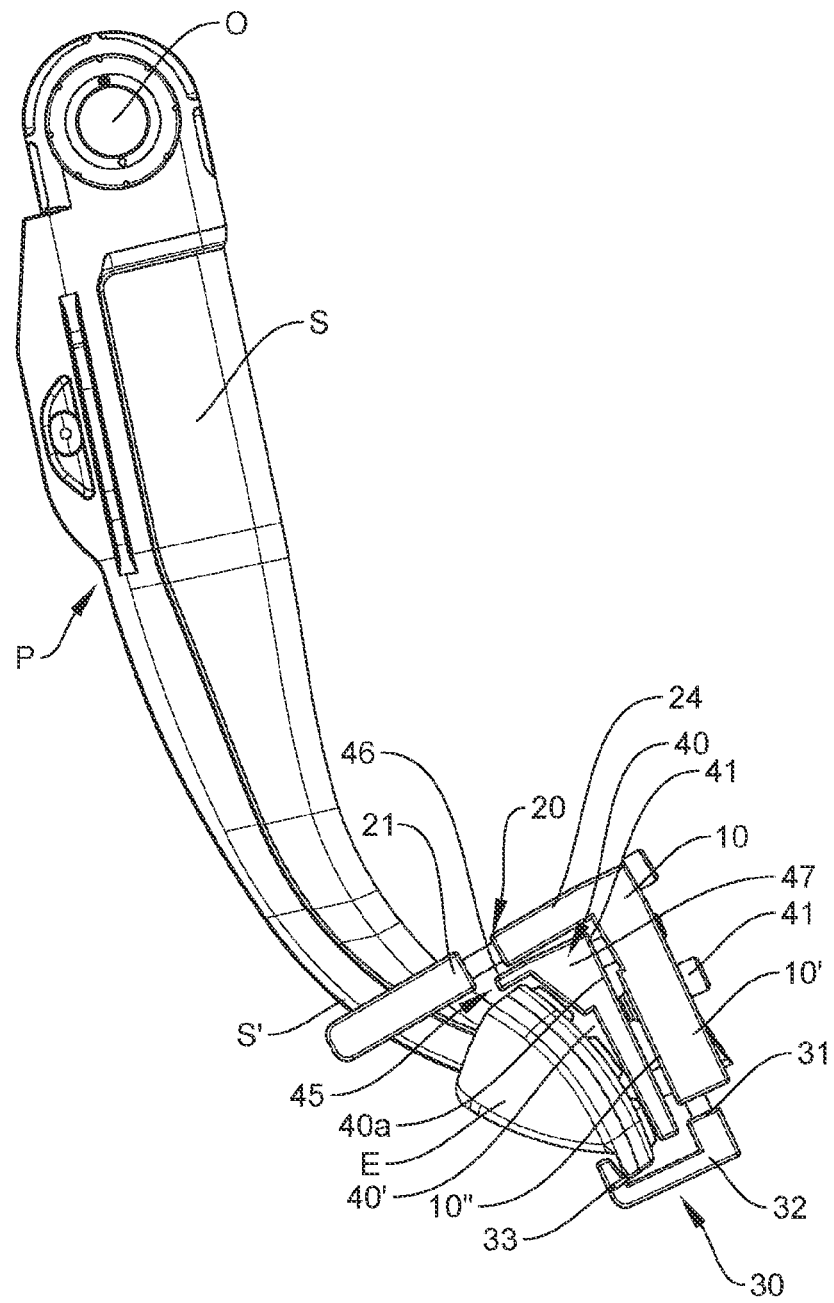
FIG. 3 is a side view of the embodiment of FIG. 1 seen from the direction III of FIG. 2.
Figure 4:
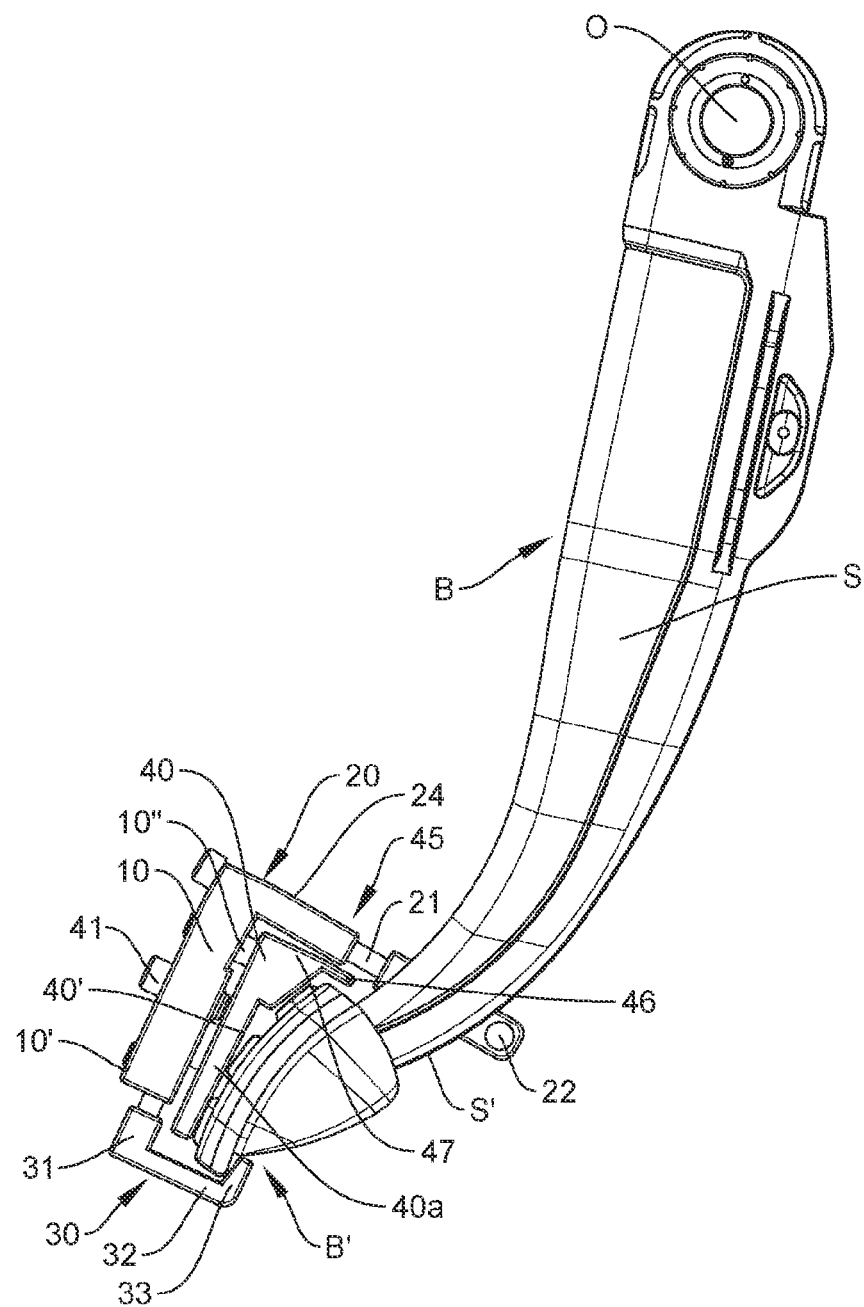
FIG. 4 is a side view of the embodiment of FIG. 1 from the direction IV of FIG. 2.

It is also preferred that—as can be seen from FIGS. 3 and 4—this rail 47 has a beveled shape. This is advantageous in particular when, as in the exemplary embodiment described, the actuating element E does not run flat, in particular as shown in the figures, but has a curved shape, since this measure allows the pressing element 40 to be supported better on the actuating element E.

For mounting the coupling device 1 on the actuating member B—with the coupling elements 20, 30 being pulled out sufficiently far—the base body 10 and thus the pressing element 40 connected to it via the clamping member 41 are brought closer to the lower end B' of the actuating member B and the pressing element 40 is brought into contact with or at least approaches the actuating element E of the actuating member B. The third coupling element 45 engages over the upper end E' of the actuating element E. If necessary, the projection 46 is positioned by a corresponding movement, so that the above-described upper stop of the coupling device 1 is formed. The first coupling element 20 is then arranged in such a way that the second leg 22 lies behind the actuating member B and preferably rests on the rear side thereof, as illustrated in FIGS. 3 and 4. If necessary, the first leg 21 of the first coupling element 20 is slid in for this purpose. In a corresponding manner, the second coupling element 30 is arranged such that the third leg 33 lies behind the lower end B' of the actuating member B, as is likewise illustrated in the figures. If required, the first leg 31 of the second coupling element 30 is slid in. It is of course obvious to the person skilled in the art that it is not mandatory for the first coupling element 20 to be positioned in front of the second coupling element 30 as described above. Of course, it is possible to position the second coupling element 30 first and subsequently the first coupling element 20, but a simultaneous positioning of these two coupling elements 20, 30 is of course also possible.

After the coupling elements 20, 30 and 45 have been positioned, the clamping member 41 is actuated in such a way that the distance between the pressing element 40 and the base body 10 is increased. The pressing element 40 is pressed against the actuating element E of the actuating member B. The base body 10 and thus the coupling elements 20, 30 and 45 connected thereto are brought into contact with the actuating member B and thus fasten it to the coupling device 1 in a form-fitting manner.

Those skilled in the art will appreciate that the above-described assembly procedure is of an exemplary nature only. Rather, it is possible to deviate from the above-described mode of operation depending on the specific design and/or configuration of the actuator B.

It should be mentioned at this point that it is not mandatory to design the pressing element 40 as a pressure plate 40', as is illustrated in the figures. It may be sufficient for certain applications that this plate-shaped pressing element 40 is omitted and consequently the clamping member 41 engages directly on the actuating member B so that the base body 10 can be moved away from the latter and the two coupling elements 20, 30 can thus be brought into positive engagement with the actuating member B.

It is also conceivable that the coupling elements 20, 30 are placed against the actuating member B in such a way that the base body 10 of the coupling device 1 is brought into contact with the actuating member B and the two coupling elements 20, 30 are then pulled against the rear side of the actuating member B by a clamping device. It can be provided that each of these two coupling elements 20, 30 has a clamping element (not shown). The pressing element 40 can then be omitted too, since the rear side 10" of the base body 10 rests on the front side of the actuating member B.

In the above description, it was assumed that at least one of the coupling elements 20, 30 is designed to be adjustable in length. Such an embodiment advantageously allows a simpler assembly and fixing of the coupling device 1 to the actuating member B. The adjustability of the coupling elements 20, 30 also advantageously allows a simple adaptability of the described coupling device 1 to actuating elements B configured in different ways, since the distance of the second leg 22 or 32 of the first and/or second coupling element 20 and/or 30 can be individually adapted to the respective actuating member B. However, such an adjustability is not mandatory. If the above-described individual adaptability can or should be omitted, it is sufficient for one or both coupling elements 20 and/or 30 to have a fixed length, i.e., are not movably arranged in the base body 10.

After the coupling device 1 has been fixed to the actuator B as described above, an actuator, in particular an actuator of a driving robot, not shown in the figures, can now be connected to the base body 10, so that an actuation movement of the actuator B is brought about by the movement of the actuator. For this purpose, it is provided that a connecting element 50 is provided on the front side 10' of the base body 10 of the coupling device 1, which makes it possible to connect the coupling device 1 to the actuator. In the case described here, it is provided that a threaded bore 51 is provided in the front side 10' of the base body 10, into which bore one end of the actuator, in particular the front end of an actuator rod, can be screwed. Of course, this manner of connection between actuator and coupling device 1 is not mandatory. Rather, a plurality of possibilities is conceivable for connecting the actuator and the coupling device 1 to one another.

Figure 2:
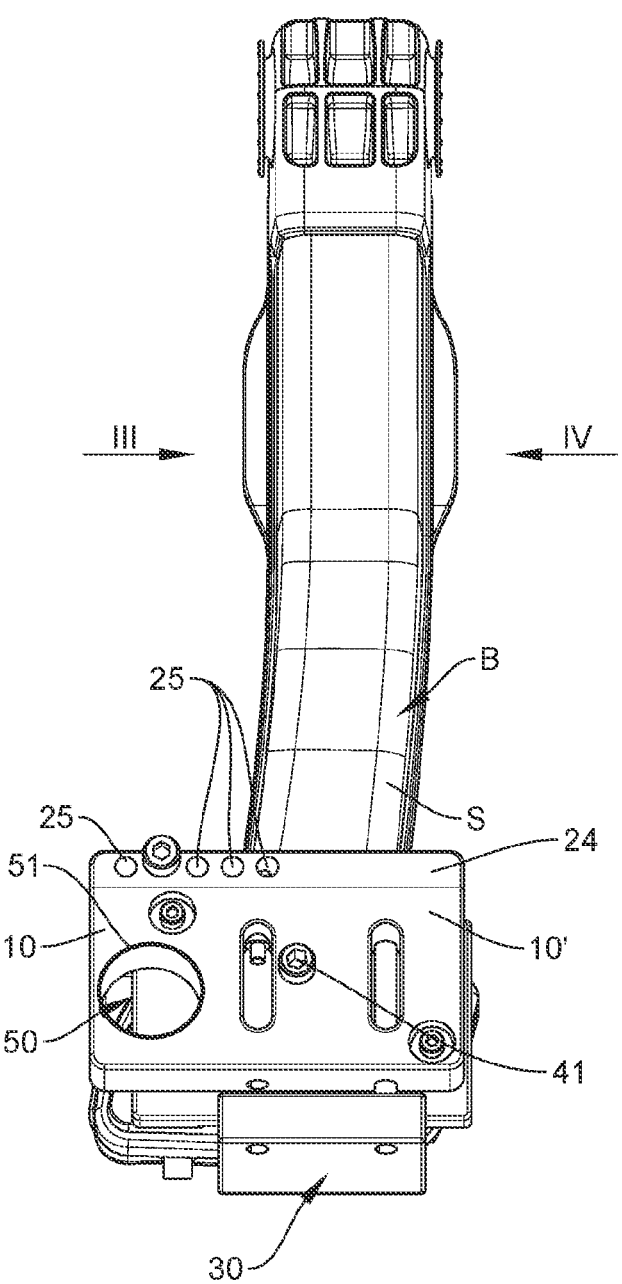
FIG. 2 is a front view of the embodiment of FIG. 1.

It is preferably provided that—as can be seen in particular in FIG. 2—the connecting element 50 is arranged offset in relation to the center of the base body 10. Such a measure has the advantage that the base body 10 can be acted upon not only by the actuator, but space for the foot of an operator remains, so that the actuating member B can be acted upon by the operator. This is advantageous, in particular, when a brake pedal is to be operated by the actuator and the coupling device 1 too, since, due to the above-described offset arrangement of the connecting element 50, a "manual" emergency braking function can still be carried out.

In summary, it is to be noted that, by means of the described measures, a coupling device 1 for an actuating member B, in particular for an actuating member B of a vehicle, is advantageously provided, which is distinguished in that the coupling device 1 can be fastened to the actuating member B in a form-fitting manner. The coupling device 1 described is characterized by its simple construction and its easy assembly. It is advantageous that, due to the length adjustability of the first leg 21 of the first coupling element 20 and/or of the first leg 31 of the second coupling element 30 and/or of the projection 46 of the third coupling element 45, not only an easier assembly, but also an adaptation to differently configured actuating elements is made possible.

In the above description it is assumed that the actuating member B is arranged suspended, that is to say that the pivot axis which is drawn through the opening O runs above the actuating element E. The described coupling device 1 is of course not limited to such an arrangement of the activation member B. Rather, it is also possible to e.g., use the coupling device 1 for an actuating member B arranged in a standing manner, i.e., in an actuating member B in which the aforementioned pivot axis extends below the actuating element E. In such an arrangement, it is then preferred that the coupling device 1 is arranged rotated by 180° in relation to the arrangement shown in FIGS. 1 to 4, so that the second coupling element 30 is thus arranged above the—then upper end B'''—of the actuating member B. It is also not mandatory for the actuating member B to be designed as a pivoting actuating member B having a pivoting arm S. The coupling device 1 described is also suitable for use—to mention just one further example—for actuating elements B, which can be actuated by a linear actuating movement, for example a displacement movement.

What is claimed is:

1. A coupling device configured for fastening an actuator to an actuating element of an actuating member, wherein the coupling device is configured to be connected to the actuator and can be brought into engagement with the actuating element, the coupling device comprising:
    a base body on which a hook-shaped first coupling element is arranged, the first coupling element comprising a first leg projecting from a rear side of the base body and a second leg extending transversely to the first leg;
    wherein the first leg, in the mounted state of the coupling device, is arranged lateral with respect to the actuating element and the second leg is arranged behind the actuating element;
    wherein the base body comprises at least one second coupling element, the second coupling element having a first leg projecting from one side of the base body and a second leg extending transversely to the first leg;
    wherein, in the mounted state, the first leg of the at least one second coupling element extends on the front side of the actuating member and the second leg of the at least one second coupling element extends transversely with respect to the first leg of the at least one second coupling element;
    wherein the first coupling element and the at least one second coupling element are configured to be secured by movement towards the base body for engagement around the actuating member in a form-fitting manner, where a movement of the first coupling element towards the base body is different in direction in comparison to a movement of the at least one second coupling element towards to the base body.

2. The coupling device according to claim 1, wherein the at least one second coupling element has a third leg projecting from the second leg, and that in the mounted state the third leg extends behind a lower end of the actuating element.

3. The coupling device according to claim 1, wherein the coupling device comprises a third coupling element which at least partially encompasses one end of an actuating element of the actuating member.

4. The coupling device according to claim 1, wherein the coupling device comprises a pressing element, via which the distance between the base body and the actuating element of the actuating member can be changed.

5. The coupling device according to claim 4, wherein the pressing element comprises a clamping element by which the actuating member can be acted upon.

6. The coupling device according to claim 4, wherein the pressing element comprises a pressing plate which can be placed on the actuating member.

7. The coupling device according to claim 2, wherein the pressing element comprises a base body, and that the third coupling element is arranged on the base body of the pressing element.

8. The coupling device according to claim 1, wherein at least one of the first leg of the first coupling element, the first leg of the at least one second coupling element is or are designed to be variable in length.

9. The coupling device according to claim 1, wherein the third coupling element comprises a projection.

10. The coupling device according to claim 9, wherein the projection of the third coupling element is arranged in the base body of the pressing element variably in length.

11. The coupling device according to claim 1, wherein at least one of the first coupling element and the at least one second coupling element is arranged or can be arranged in variable positions on the base body of the coupling device.

12. The coupling device according to claim 1, wherein a connecting element is provided on the front side of the base body, by means of which the actuator can be fixed to the coupling device.

13. The coupling device according to claim 12, wherein the connecting element is arranged decentrally in or on the base body.

14. The coupling device according to claim 1, wherein the movement of the first coupling element towards the base body is orthogonal in direction in comparison to the movement of the at least one second coupling element towards to the base body.

* * * * *

UNITED STATES PATENT AND TRADEMARK OFFICE
CERTIFICATE OF CORRECTION

PATENT NO. : 12,455,588 B2
APPLICATION NO. : 18/161073
DATED : October 28, 2025
INVENTOR(S) : Dieter Staehle Page 1 of 1

It is certified that error appears in the above-identified patent and that said Letters Patent is hereby corrected as shown below:

On the Title Page

Column 1, below the Related U.S. Application Data:
Insert --(30) Foreign Application Priority Data
Jul. 30, 2020 (DE) ........... 10 2020 004 636.3
Jul. 30, 2020 (DE) ........... 20 2020 003 278.6--.

Signed and Sealed this
Third Day of February, 2026

John A. Squires
*Director of the United States Patent and Trademark Office*